UNITED STATES PATENT OFFICE 2,189,570

INSECTICIDE

Milton S. Schechter and Herbert L. J. Haller, Washington, D. C.; dedicated to the free use of the People of the United States of America No Drawing. Application November 14, 1938, Serial No. 240,354

8 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the People of the United States of America to take effect on the granting of a patent to us.

Our invention relates to improvements in materials for destroying or checking the growth or multiplication of living organisms, whether plant or animal, which are economically injurious to man.

An object of the invention is to provide a material suitable for use as an insecticide.

We have found that compounds of the type

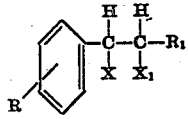

where X and X' are halogen atoms such as Cl, Br, etc., and may or may not be the same, and where either R or R' may be a hydrogen atom, a nitro group, or an alkyl group of the general formula $C_nH_{2n+1}$ such as $CH_3$, $C_2H_5$, $C_3H_7$, etc., have powerful insecticidal properties, whether applied externally or internally; that these organic products may be sprayed or dusted upon delicate vegetation without injuring it.

One of the preferred compounds comprised in our invention is alpha, beta-dibromoethylbenzene, also known as styrene dibromide, the structural formula of which is shown in Formula I.

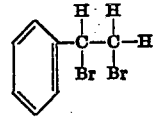

I

Another of the preferred compounds comprised in our invention is alpha, beta-dibromo-beta-nitroethylbenzene, also known as omega-nitrostyrenedibromide whose structural formula is shown in Formula II.

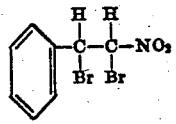

These compounds are insoluble in water but soluble in organic solvents. They may be reduced to impalpable powders by grinding and applied to vegetation either dry, as a dust, or wet, as a spray. The products being soluble in refined mineral oils, may be applied as components of oil emulsion sprays. When applied as a spray in water it is desirable to incorporate an effective wetting agent. These compounds may also be applied by dissolving them in acetone and pouring the acetone solutions into water whereupon fine colloidal precipitates are formed. Such preparations may be applied directly to plants or they may be combined with a suitable wetting agent and then sprayed.

The value of these compounds as insecticides has been proved by extensive biological tests, for example, alpha, beta-dibromoethylbenzene gave the following results:

1. Upon fourth instar mosquito larvae in water, the mortality was 100% at a concentration of 100 parts per million after 18 hours.
2. Upon third instar cross-striped cabbage worm as a dust in a concentration of 200 micrograms per sq. cm. of foliage the mortality was 100% after 48 hours.
3. Upon fifth instar cross-striped cabbage worm as a dust in a concentration of 200 micrograms per sq. cm. of foliage the mortality was 100% after 48 hours.
4. Upon third instar southern army worm as a dust in a concentration of 200 micrograms per sq. cm. of foliage the mortality was 100% after 48 hours.
5. Upon sixth instar southern army worm as a dust in a concentration of 95 micrograms per sq. cm. of foliage the mortality was 83% after 48 hours.

Alpha, beta - dibromo - beta-nitroethylbenzene gave the following results:

1. Upon fourth instar cross-striped cabbage worm as a dust in a concentration of 155 micrograms per sq. cm. of foliage the mortality was 97% after 48 hours.
2. Upon fifth instar southern army worm as a dust in a concentration of 250 micrograms per sq. cm. of foliage the mortality was 83% after 48 hours.

It is to be understood that the above-mentioned compounds and examples are cited merely by way of illustration and not by limitation, and that this invention is not restricted thereby.

Having thus described our invention, we claim:

1. An insecticide comprising as its essential active ingredient alpha, beta-dibromoethylbenzene.

2. An insecticide comprising as its essential active ingredient alpha, beta-dibromo-beta-nitroethylbenzene.

3. An insecticide comprising as its essential active ingredient an organic compound of the structure

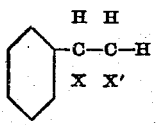

where X and X' are halogen atoms.

4. An insecticide comprising as its essential active ingredient an organic compound of the structure

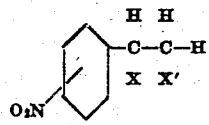

where X and X' are halogen atoms.

5. An insecticide comprising as its essential active ingredient an organic compound of the structure

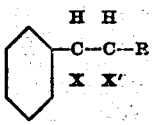

where X and X' are halogen atoms, and R is an alkyl radical of the general formula $C_nH_{2n+1}$.

6. An insecticide comprising as its essential active ingredient an organic compound of the structure

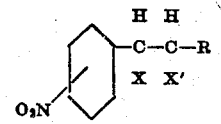

where X and X' are halogen atoms, and R is an alkyl radical of the general formula $C_nH_{2n+1}$.

7. An insecticide comprising as its essential active ingredient an organic compound of the structure

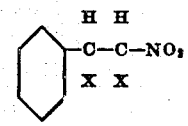

where X and X' are halogen atoms.

8. An insecticide comprising as its essential active ingredient an organic compound of the structure

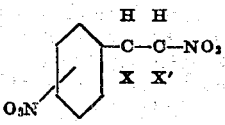

where X and X' are halogen atoms.

MILTON S. SCHECHTER.
HERBERT L. J. HALLER.